(12) United States Patent
Shi et al.

(10) Patent No.: US 11,831,003 B2
(45) Date of Patent: Nov. 28, 2023

(54) PASTE EXTRUDING DEVICE AND METHOD FOR TUBULAR POSITIVE PLATE

(71) Applicant: ANHUI UPLUS ENERGY BATTERY TECH CO LTD, Huaibei (CN)

(72) Inventors: Peng Shi, Huaibei (CN); Sheng Dong, Huaibei (CN); Yi Ding, Huaibei (CN); Zhan Xiao, Huaibei (CN); Yi Liu, Huaibei (CN)

(73) Assignee: ANHUI UPLUS ENERGY BATTERY TECH CO LTD, Huaibei (CN)

( * ) Notice: Subject to any disclaimer, the term of this patent is extended or adjusted under 35 U.S.C. 154(b) by 0 days.

(21) Appl. No.: 18/023,387

(22) PCT Filed: Dec. 25, 2020

(86) PCT No.: PCT/CN2020/139417
§ 371 (c)(1),
(2) Date: Feb. 27, 2023

(87) PCT Pub. No.: WO2022/041599
PCT Pub. Date: Mar. 3, 2022

(65) Prior Publication Data
US 2023/0327069 A1    Oct. 12, 2023

(30) Foreign Application Priority Data

Aug. 31, 2020 (CN) .......................... 202010892876.7

(51) Int. Cl.
*H01M 4/04* (2006.01)
*H01M 4/20* (2006.01)
*H01M 10/04* (2006.01)

(52) U.S. Cl.
CPC ........... *H01M 4/0411* (2013.01); *H01M 4/20* (2013.01); *H01M 10/0404* (2013.01)

(58) Field of Classification Search
None
See application file for complete search history.

(56) References Cited

U.S. PATENT DOCUMENTS

2015/0140430 A1    5/2015   Ando et al.

FOREIGN PATENT DOCUMENTS

| CN | 101567443 A | 10/2009 |
| CN | 207009554 U | 2/2018 |
| CN | 109148832 A | 1/2019 |
| CN | 209631049 U | 11/2019 |

*Primary Examiner* — Tracy M Dove
(74) *Attorney, Agent, or Firm* — Bayramoglu Law Offices LLC

(57) ABSTRACT

A paste extruding device for a tubular positive plate includes a plate main body. The plate main body includes a cross beam, ribs and a tab. The ribs are linearly distributed on a bottom surface of the cross beam, and the tab is provide on a top surface of the cross beam. A processing tube is sleeved outside the rib, and the processing tube has a cavity shell structure with an open top. A filling cavity is formed between the rib and the processing tube, and a sliding groove is provided at a vertical central line of an outer wall of the processing tube. A processing sliding base is slidably sleeved on the outer wall of the processing tube. A paste extruding cavity is provided at an inner top of the processing sliding base, and a cooling cavity is provided at an inner bottom of the processing sliding base.

9 Claims, 4 Drawing Sheets

PASTE EXTRUDING DEVICE AND METHOD FOR TUBULAR POSITIVE PLATE

CROSS REFERENCE TO THE RELATED APPLICATIONS

This application is the national phase entry of International Application No. PCT/CN2020/139417, filed on Dec. 25, 2020, which is based upon and claims priority to Chinese Patent Application No. 202010892876.7, filed on Aug. 31, 2020, the entire contents of which are incorporated herein by reference.

TECHNICAL FIELD

The present disclosure relates to the technical field of lead-carbon battery processing, and in particular, to a paste extruding device and method for a tubular positive plate.

BACKGROUND

As a novel super battery, a lead-carbon battery combines a lead-acid battery and a supercapacitor, which gives play to the advantage of instantaneous large-capacity charging of the supercapacitor and the advantage of specific energy of the lead-acid battery, and has very good charging and discharging performance: the lead-carbon battery can be fully charged in 90 minutes. Moreover, due to the addition of carbon (graphene), sulfation of a negative electrode is prevented, thereby improving a factor of battery failure in the past and prolonging the battery life. During production of the lead-carbon battery, paste extruding type positive plates need to be produced in the following process: preparing lead paste from dilute sulfuric acid solution, pure water, red lead and additives, and then extruding the lead paste into a drain pipe by a paste extruder.

Current paste extruding and curing devices perform a one-time paste extruding operation. After the paste extrusion is completed, a curing tool needs to be transferred to a solidification apparatus for curing. This causes a long process time, and the lead paste will flow due to the intermediate transfer, which affects the molding effect of a lead paste coating. In addition, the injection of all the lead paste at one time may lead to a large operating range of the curing apparatus and high solidification difficulty.

SUMMARY

In view of the disadvantages existing in the prior art, the present disclosure provides a paste extruding device for a tubular positive plate, with specific technical solutions as follows:

A paste extruding device for a tubular positive plate includes a plate main body, where the plate main body includes a cross beam, ribs and a tab, the ribs are linearly distributed on a bottom surface of the cross beam, and the tab is provide on a top surface of the cross beam; a processing tube is sleeved outside the rib, and the processing tube has a cavity shell structure with an open top; a bottom end of the rib is inserted into an inner bottom of the processing tube, a uniform cavity area between the rib and the processing tube is a filling cavity, and a sliding groove is provided at a vertical central line of an outer wall of the processing tube; and the sliding groove has a structure with an open top end and a closed bottom end; and a processing sliding base is slidably sleeved on the outer wall of the processing tube, a paste extruding cavity is provided at an inner top of the processing sliding base, and a cooling cavity is provided at an inner bottom of the processing sliding base; an output end of the paste extruding cavity communicates with the filling cavity, and an input end of the paste extruding cavity communicates with a paste extruder; the cooling cavity communicates with a cooling water tank, and the cooling cavity is configured to cool and solidify lead paste inside the filling cavity; a bottom end of the processing tube is connected to a lifting component, and the lifting component is configured to drive the processing tube to move from top to bottom.

Further, each of a side cross-section of the rib, a side cross-section of the processing tube and a side cross-section of the processing sliding base has a circular tube structure, the processing tubes are sleeved outside the ribs at intervals, and the processing sliding base is attached to and slidably sleeved on the outer wall of the processing tube.

Further, a length of the rib is identical to a length of the filling cavity, and a distribution length of the paste extruding cavity is one third of the length of the filling cavity; and the distribution length of the paste extruding cavity is identical to a distribution length of the cooling cavity.

Further, a single filling area of the filling cavity is identical to an area covered by the paste extruding cavity.

Further, an inner wall of the processing sliding base is provided with a blocking sliding member at a position opposite to the sliding groove, and a length of the blocking sliding member is identical to a length of the processing sliding base; the blocking sliding member is attached to and embedded in the sliding groove, an inner wall of the blocking sliding member is flush with an inner wall of the sliding groove, an interior of the blocking sliding member is provided with a paste outlet at a position opposite to the paste extruding cavity, and the paste outlet is configured to discharge the lead paste to the filling cavity.

Further, a thermal insulation partition plate is vertically provided on an inner wall of a top end of the blocking sliding member, and the thermal insulation partition plate has a ring structure; the thermal insulation partition plate is slidably attached to an inner wall of the filling cavity, and the thermal insulation partition plate is configured to block the lead paste from above.

A paste extruding method for a tubular positive plate is provided, where the paste extruding method includes the following steps:
  S1: inserting each rib of a plate main body into a corresponding processing tube, where a bottom end of the rib is inserted into a fixing base at an inner bottom of the processing tube;
  S2: connecting a paste extruder in parallel to each paste extruding cavity by a conduit, and connecting a cooling water tank in parallel to each cooling cavity and the paste extruder by a conduit;
  S3: performing primary paste extrusion processing:
  driving, by a lifting component, the processing tube to move to an uppermost position, where an area of the filling cavity opposite to the paste extruding cavity is a first filling area, a blocking sliding member is located at a bottom of a sliding groove, a thermal insulation partition plate blocks at a top surface of the first filling area, and the fixing base is located at a bottom of the first filling area; and
  extruding lead paste by the paste extruder, such that the first filling area is gradually filled with the lead paste, the thermal insulation partition plate blocks the lead paste from the top, the blocking sliding member blocks the lead paste from a side portion, and the fixing base blocks the lead paste from the bottom until the first filling area is fully filled with the lead paste;

S4: performing secondary paste extrusion processing:

driving, by the lifting component, the processing tube to move downwards, such that the first filling area is arranged opposite to the cooling cavity, and an area of the filling cavity opposite to the paste extruding cavity is a second filling area; during the upward movement, the lead paste in the first filling area is rapidly solidified by the cooling cavity to form a solid first lead paste coating; and extruding lead paste by the paste extruder, such that the second filling area is gradually filled with the lead paste, the thermal insulation partition plate blocks the lead paste from the top, the blocking sliding member blocks the lead paste from a side portion, and the first lead paste coating blocks the lead paste from the bottom until the second filling area is fully filled with the lead paste;

S5: performing tertiary paste extrusion processing:

driving, by the lifting component, the processing tube to move downwards, such that the second filling area is arranged opposite to the cooling cavity, and an area of the filling cavity opposite to the paste extruding cavity is a third filling area; during the upward movement, the lead paste in the second filling area is rapidly solidified by the cooling cavity to form a solid second lead paste coating; and extruding lead paste by the paste extruder, such that the third filling area is gradually filled with the lead paste, the thermal insulation partition plate blocks the lead paste from the top, the blocking sliding member blocks the lead paste from a side portion, the second lead paste coating blocks the lead paste from the bottom until the third filling area is fully filled with the lead paste, and the entire filling cavity is also completely filled;

S6: performing quaternary paste extrusion processing:

driving, by the lifting component, the processing tube to move downwards, such that the third filling area is arranged opposite to the cooling cavity, and the paste extruding cavity no longer corresponds to the filling cavity; during the upward movement, the lead paste in the third filling area is rapidly solidified by the cooling cavity to form a solid third lead paste coating; and S7: demolding and taking out the positive plate.

Further, the demolding and taking out the positive plate specifically includes: driving, by the lifting component, the processing tube to move downwards, such that the processing tube is separated from a processing sliding base, and removing a half of a shell of the processing tube, such that the positive plate is pulled out upwards, and the rib and a lead paste coating on an outer wall of the rib are separated from the corresponding processing tube.

The present disclosure has the following beneficial effects:

1. The lifting component drives the processing tube to move from bottom to top, such that paste can be extruded on the outer walls of the ribs step by step from bottom to top, and the paste extrusion and cooling molding can be completed continuously, thereby effectively improving the processing efficiency; and the processing from top to bottom enables the coatings formed at the bottom to support the lead paste at the top of the coatings as supporting members, thereby ensuring the continuity of the coatings and improve a molding effect.

2. By using the thermal insulation partition plate and the blocking sliding member, the single filling area can have very good thermal insulation and sealing property, so as to avoid premature cooling of the lead paste and lead paste leakage.

Figure 1:
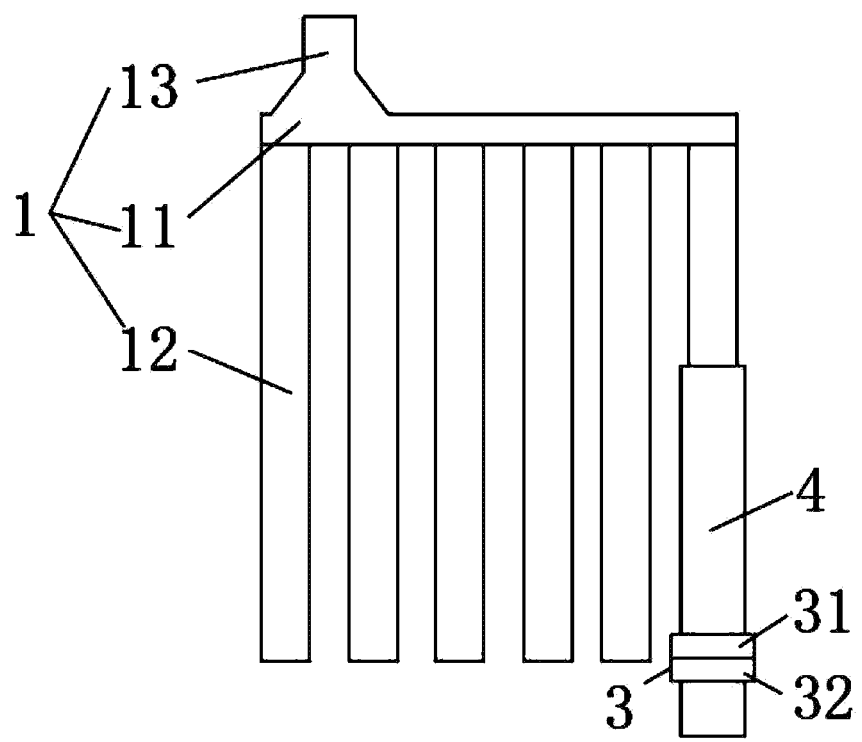
FIG. 1 shows a schematic diagram of an assembled structure of a positive plate and a paste extruding device according to the present disclosure.

In the figures: 1. Plate main body, 11. Cross beam, 12. Ribs, 13. Tab, 2. Thermal insulation partition plate, 3. Processing sliding base, 31. Paste extruding cavity, 311. Paste inlet joint, 32. Cooling cavity, 33. Blocking sliding member, 331. Paste outlet, 4. Processing tube, 41. Fixing base, 42. Sliding groove, 43. Filling cavity, 5. Paste extruder, 6. Cooling water tank, 7. Lifting component, 71. Connecting rod.

DETAILED DESCRIPTION OF THE EMBODIMENTS

In order to make the objectives, technical solutions, and advantages of the present disclosure clearer, the present disclosure will be further described in detail below in conjunction with embodiments. It should be understood that the specific embodiments described herein are merely intended to explain the present disclosure but not to limit the present disclosure.

A paste extruding device for a tubular positive plate includes plate main body 1, where the plate main body 1 includes cross beam 11, ribs 12 and tab 13, the ribs 12 are linearly distributed on a bottom surface of the cross beam 11, and the tab 13 is provide on a top surface of the cross beam 11; processing tube 4 is sleeved outside the rib 12, and the processing tube 4 has a cavity shell structure with an open top; a bottom end of the rib 12 is inserted into an inner bottom of the processing tube 4, a uniform cavity area between the rib 12 and the processing tube 4 is filling cavity 43, and sliding groove 42 is provided at a vertical central line of an outer wall of the processing tube 4; the sliding groove 42 has a structure with an open top end and a closed bottom end; the processing tube 4 is configured to serve as an external molding area of a lead paste coating, and the filling cavity 43 is a molding cavity of the lead paste coating.

Processing sliding base 3 is slidably sleeved on the outer wall of the processing tube 4, paste extruding cavity 31 is provided at an inner top of the processing sliding base 3, and cooling cavity 32 is provided at an inner bottom of the processing sliding base 3. An output end of the paste extruding cavity 31 communicates with the filling cavity 43, and an input end of the paste extruding cavity 31 communicates with paste extruder 5.

The cooling cavity 32 communicates with cooling water tank 6, and the cooling cavity 32 is configured to cool and solidify lead paste inside the filling cavity.

A bottom end of the processing tube 4 is connected to lifting component 7, and the lifting component 7 is configured to drive the processing tube 4 to move from top to bottom. The lifting component 7 drives the processing tube 4 to move from bottom to top, such that paste can be extruded on the outer walls of the ribs 12 step by step from bottom to top, and the paste extrusion and cooling molding can be completed continuously, thereby effectively improving the processing efficiency; and the processing from top to bottom enables the coatings formed at the bottom to support the lead paste at the top of the coatings as supporting members, thereby ensuring the continuity of the coatings and improve a molding effect.

As an improvement of the above technical solution, each of a side cross-section of the rib 12, a side cross-section of the processing tube 4 and a side cross-section of the processing sliding base 3 has a circular tube structure, the processing tubes 4 are sleeved outside the ribs 12 at intervals, and the processing sliding base 3 is attached to and slidably sleeved on the outer wall of the processing tube 4. The circular tube structure can effectively increase the contact area of the ribs while reducing the thickness of the positive plate, and the circular tube structure also facilitates the arrangement of the sliding groove.

As an improvement of the above technical solution, a length of the rib 12 is identical to a length of the filling cavity 43, and a distribution length of the paste extruding cavity 31 is one third of the length of the filling cavity 43; and the distribution length of the paste extruding cavity 31 is identical to a distribution length of the cooling cavity 32. After the tertiary paste extrusion operation is performed, the filling cavity can be filled, so as to realize step-by-step filling, avoid lead paste from flowing and scattering, ensure a molding effect and reduce the cooling difficulty.

As an improvement of the above technical solution, a single filling area of the filling cavity 43 is identical to an area covered by the paste extruding cavity 31. The single filling area is a covering surface of the paste extruding cavity 31. This ensures that the paste extruding cavity 31 can complete a paste extrusion action by displacement and filling for three times, and the lead paste filling range is just completely covered by the cooling cavity, thereby ensuring a solidification effect.

As an improvement of the above technical solution, an inner wall of the processing sliding base 3 is provided with blocking sliding member 33 at a position opposite to the sliding groove 42, and a length of the blocking sliding member 33 is identical to a length of the processing sliding base 3; the blocking sliding member 33 is attached to and embedded in the sliding groove 42, an inner wall of the blocking sliding member 33 is flush with an inner wall of the sliding groove 42, an interior of the blocking sliding member 33 is provided with a paste outlet 331 at a position opposite to the paste extruding cavity 31, and the paste outlet 331 is configured to discharge the lead paste to the filling cavity 43. The blocking sliding member 33 can guide the displacement process of the processing sliding base 3, to make the processing sliding base 3 move more smoothly, and can block a sliding groove part opposite to the lead paste to prevent the lead paste from leaking out. Each blocking sliding member 33 is internally provided with one paste outlet 331, and 1-2 paste outlets 331 may be arranged according to production needs to improve the processing efficiency. Each blocking sliding member 33 corresponds to one sliding groove 42.

As an improvement of the above technical solution, thermal insulation partition plate 2 is vertically provided on an inner wall of a top end of the blocking sliding member 33, and the thermal insulation partition plate 2 has a ring structure; the thermal insulation partition plate 2 is slidably attached to an inner wall of the filling cavity 43, and the thermal insulation partition plate 2 is configured to block the lead paste from above. The thermal insulation partition plate 2 can block the lead paste from above, such that the lead paste is gathered in the single filling area to improve the molding effect, and the heat loss can also be prevented to prevent premature solidification of the lead paste.

A paste extruding method for a tubular positive plate is provided, where the paste extruding method includes the following steps.

S1: Each rib 12 of a plate main body 1 is inserted into corresponding processing tube 4, where a bottom end of the rib 12 is inserted into a fixing base 41 at an inner bottom of the processing tube 4. This step is used to assemble a positive plate to be coated with lead paste and a paste extruding device, such that each rib is fixed to the corresponding processing tube. A part of the rib that is inserted into a fixing base is not coated with the lead paste, which can facilitate the subsequent insertion of the rib into a battery compartment base.

S2: Paste extruder 5 is connected in parallel to a paste inlet joint 311 of each paste extruding cavity 31 by a conduit, and cooling water tank 6 is connected in parallel to each cooling cavity and the paste extruder 5 by a conduit. The cooling water tank 6 can circularly provide cooling water to the cooling cavity and the paste extruder, and the cooling water can absorb heat of the lead paste, such that the lead paste is quickly solidified into a lead paste coating. The cooling water can further cool the paste extruder, such that the paste extruder operates stably.

Figure 2:
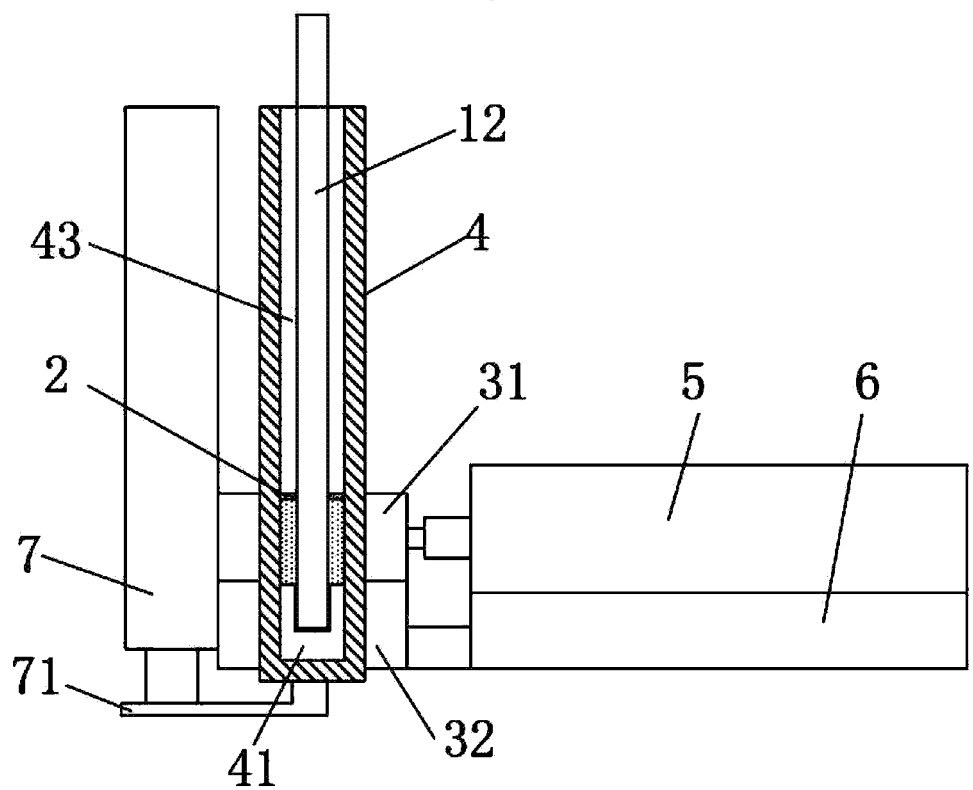
FIG. 2 shows a schematic structural diagram of a primary paste extrusion processing state according to the present disclosure.
Figure 3:
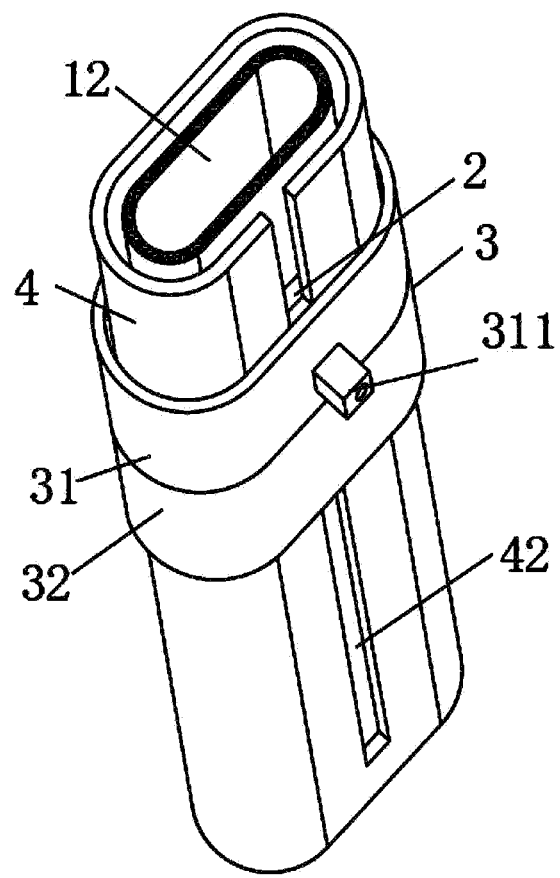
FIG. 3 shows a schematic diagram of an overall structure of a processing sliding base and a processing tube in cooperation according to the present disclosure.
Figure 4:
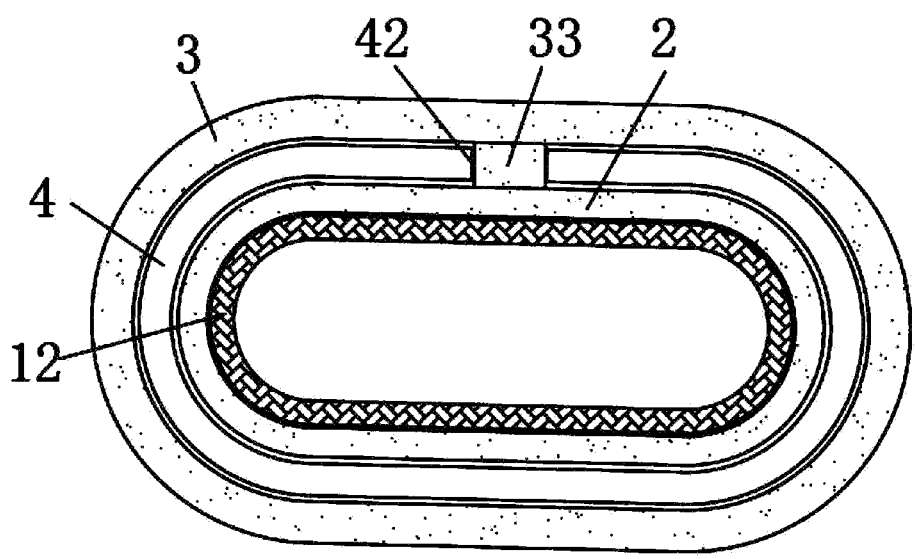
FIG. 4 shows a schematic top view of a cross-sectional structure of a thermal insulation partition plate, a processing tube and ribs in cooperation according to the present disclosure.
Figure 5:
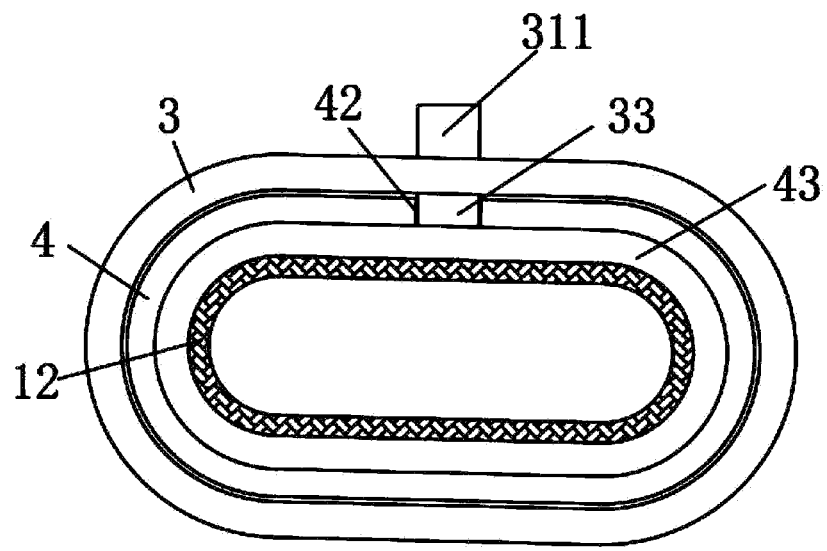
FIG. 5 shows a schematic top view of a cross-sectional structure of a processing sliding base, a processing tube and a filling cavity in cooperation according to the present disclosure.
Figure 6:
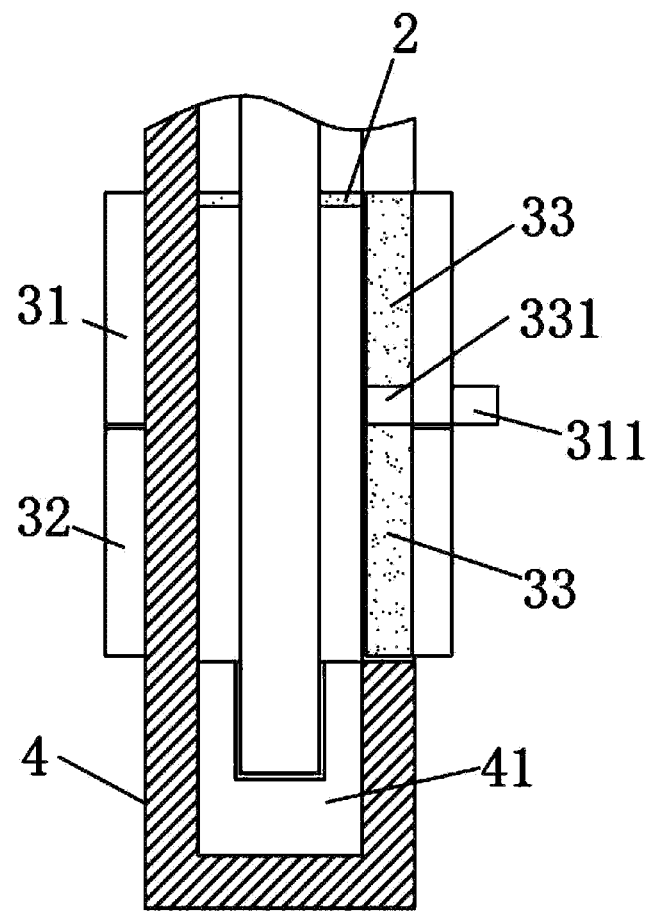
FIG. 6 shows a schematic side view of a cross-sectional structure of a processing sliding base and a processing tube according to the present disclosure.

As shown in FIG. 2, S3: Primary paste extrusion processing is performed.

Lifting component 7 drives the processing tube 4 to move to an uppermost position, where an area of the filling cavity 43 opposite to the paste extruding cavity 31 is a first filling area, blocking sliding member 33 is relatively located at the bottom of sliding groove 42, a top half of the blocking sliding member 33 blocks a side portion of the first filling area, thermal insulation partition plate 2 blocks at a top surface of the first filling area, and the fixing base 41 is located at a bottom of the first filling area. Processing is performed first from the bottom of the filling cavity 43, such that the blocking sliding member, the thermal insulation partition plate and the fixing base can form a blocking space outside the first filling area, and thus the lead paste can only be molded in this area, thereby effectively improving the molding effect.

The paste extruder 5 extrudes the lead paste, such that the first filling area is gradually filled with the lead paste, the thermal insulation partition plate 2 blocks the lead paste from the top, the blocking sliding member 33 blocks the lead paste from a side portion, and the fixing base 41 blocks the lead paste from the bottom until the first filling area is fully filled with the lead paste. The lead paste extruded by the paste extruder 5 directly enters the paste extruding cavity 31, and then is discharged to the first filling area through paste outlet 331 inside the blocking sliding member 33.

Figure 7:
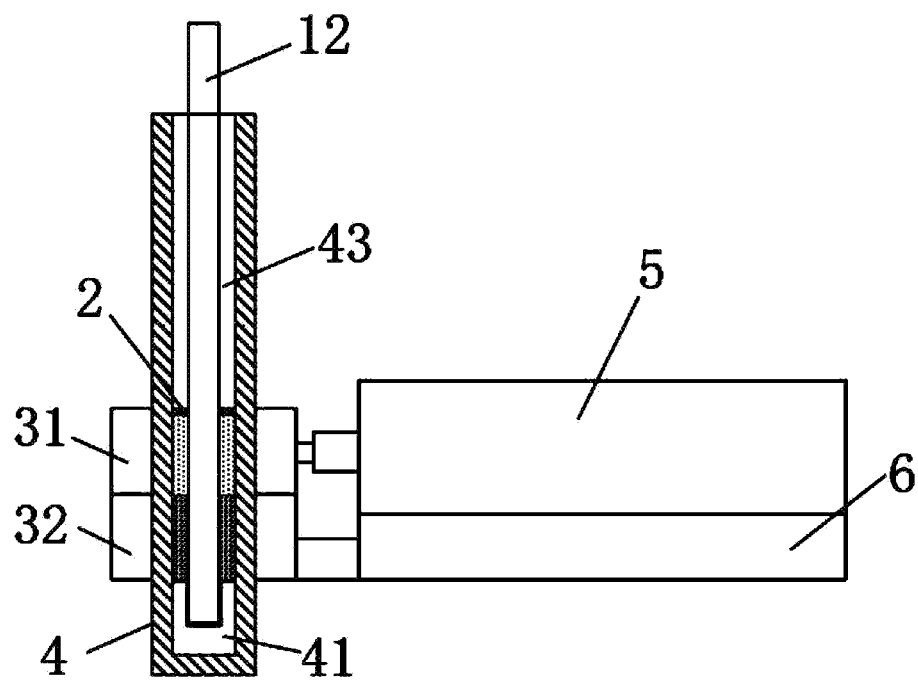
FIG. 7 shows a schematic structural diagram of a secondary paste extrusion processing state according to the present disclosure.

As shown in FIG. 7, S4: Secondary paste extrusion processing is performed.

The lifting component 7 drives the processing tube 4 to move downwards, such that the first filling area is arranged opposite to the cooling cavity 32, and an area of the filling cavity 43 opposite to the paste extruding cavity 31 is a second filling area. The lifting component 7 is, for example, a pneumatic rod, and a bottom end of the pneumatic rod is fixedly connected to a bottom end of the processing tube 4 by a connecting rod. When the lifting component 7 drives the processing tube to move downwards, the entire processing sliding base 3 relatively moves upwards along the sliding groove 42, and the thermal insulation partition plate 2 also relatively slides upwards along the filling cavity 43, such that an upper half of the blocking sliding member 33 can be relatively blocked on a side portion of the second filling area, and a lower half of the blocking sliding member 33 can be blocked on the side portion of the first filling area, thereby ensuring that the lead paste does not leak out.

During the upward movement, the lead paste in the first filling area is rapidly solidified by the cooling cavity 32 to form a solid first lead paste coating. The cooling water in the cooling water tank 6 circulates through the cooling cavity 32, thereby taking away the heat in the first filling area, and solidifying and molding the lead paste in the first filling area. The cooling and solidification process is performed during the upward movement of the lifting component. When the lifting component is in place, a second filling cavity can be directly filled without waiting, which makes the entire process more coherent and efficient.

The paste extruder 5 extrudes the lead paste, such that the second filling area is gradually filled with the lead paste, the thermal insulation partition plate 2 blocks the lead paste from the top, the blocking sliding member 33 blocks the lead paste from a side portion, and the first lead paste coating blocks the lead paste from the bottom until the second filling area is fully filled with the lead paste. After the lead paste in the first filling area is solidified, the second filling area is filled, the solid first lead paste coating can support the lead paste from the bottom, and structural molecules of the solid first lead paste coating and the lead paste are the same, such that a bonding effect is good.

S5: Tertiary paste extrusion processing is performed. The operation process of the tertiary paste extrusion processing is the same as the process of the secondary paste extrusion processing.

The lifting component 7 drives the processing tube 4 to move downwards, such that the second filling area is arranged opposite to the cooling cavity 32, and an area of the filling cavity 43 opposite to the paste extruding cavity 31 is a third filling area; during the upward movement, the lead paste in the second filling area is rapidly solidified by the cooling cavity to form a solid second lead paste coating.

The paste extruder 5 extrudes lead paste, such that the third filling area is gradually filled with the lead paste, the thermal insulation partition plate 2 blocks the lead paste from the top, the blocking sliding member 33 blocks the lead paste from a side portion, the second lead paste coating blocks the lead paste from the bottom until the third filling area is fully filled with the lead paste, and the entire filling cavity is also completely filled.

Figure 8:
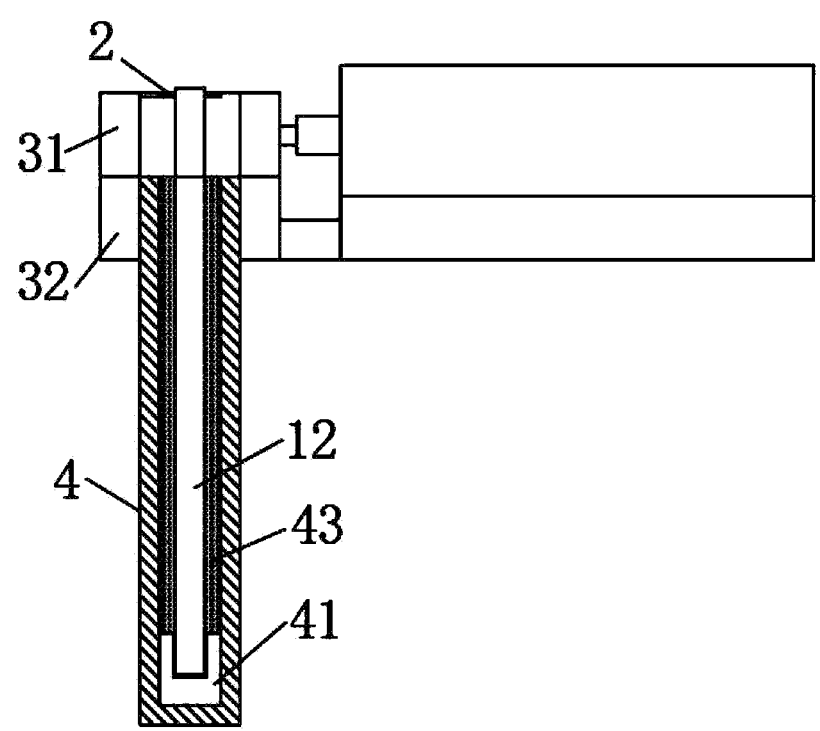
FIG. 8 shows a schematic structural diagram of a quaternary paste extrusion processing state according to the present disclosure.

As shown in FIG. 8, S6: Quaternary paste extrusion processing is performed.

The lifting component 7 drives the processing tube 4 to move downwards, such that the third filling area is arranged opposite to the cooling cavity 32, and the paste extruding cavity 31 no longer corresponds to the filling cavity 43. Since the paste extruding cavity 31 has a length that is one third of the length of the filling cavity 43, the entire filling cavity 43 can also be filled after the above tertiary paste extrusion action is performed. During the quaternary paste extrusion action, the paste extruding cavity extends out to the processing tube without extruding the lead paste, and only the lead paste in the third filling area needs to be cooled and solidified.

The lead paste in the third filling area is rapidly solidified by the cooling cavity to form a solid third lead paste coating.

S7: The positive plate is pulled out upwards, and the rib and a lead paste coating on an outer wall of the rib are separated from the corresponding processing tube. After the action is performed for four times, the paste extrusion and solidification can be completed synchronously, and then demolding can be performed and the positive plate is pulled out.

The lifting component drives the processing tube to move downwards, such that the processing tube is separated from a processing sliding base, and removing a half of a shell of the processing tube, such that the positive plate is pulled out upwards, and the rib and a lead paste coating on an outer wall of the rib are separated from the corresponding processing tube. The processing tube is formed by sealing and assembling two flat tube shell structures by a screw.

The above described are merely preferred embodiments of the present disclosure, and not intended to limit the present disclosure. Any modifications, equivalent replacements and improvements made within the spirit and principle of the present disclosure should all fall within the scope of protection of the present disclosure.

What is claimed is:

1. A paste extruding device for a tubular positive plate, comprising a plate main body, wherein the plate main body comprises a cross beam, ribs and a tab, the ribs are linearly distributed on a bottom surface of the cross beam, and the tab is provide on a top surface of the cross beam; a processing tube is sleeved outside the rib, and the processing tube has a cavity shell structure with an open top; a bottom end of the rib is inserted into an inner bottom of the processing tube, a uniform cavity area between the rib and the processing tube is a filling cavity, and a sliding groove is provided at a vertical central line of an outer wall of the processing tube; and the sliding groove has a structure with an open top end and a closed bottom end; and a processing sliding base is slidably sleeved on the outer wall of the processing tube, a paste extruding cavity is provided at an inner top of the processing sliding base, and a cooling cavity is provided at an inner bottom of the processing sliding base; an output end of the paste extruding cavity communicates with the filling cavity, and an input end of the paste extruding cavity communicates with a paste extruder; the cooling cavity communicates with a cooling water tank, and the cooling cavity is configured to cool and solidify lead paste inside the filling cavity; a bottom end of the processing tube is connected to a lifting component, and the lifting component is configured to drive the processing tube to move from top to bottom.

2. The paste extruding device for the tubular positive plate according to claim 1, wherein each of a side cross-section of the rib, a side cross-section of the processing tube and a side cross-section of the processing sliding base has a circular tube structure, processing tubes are sleeved outside the ribs at intervals, and the processing sliding base is attached to and slidably sleeved on the outer wall of the processing tube.

3. The paste extruding device for the tubular positive plate according to claim 1, wherein a length of the rib is identical to a length of the filling cavity, and a distribution length of the paste extruding cavity is one third of the length of the filling cavity; and the distribution length of the paste extruding cavity is identical to a distribution length of the cooling cavity.

4. The paste extruding device for the tubular positive plate according to claim 3, wherein a single filling area of the filling cavity is identical to an area covered by the paste extruding cavity.

5. The paste extruding device for the tubular positive plate according to claim 4, wherein an inner wall of the processing sliding base is provided with a blocking sliding member at a position opposite to the sliding groove, and a length of the blocking sliding member is identical to a length of the processing sliding base; the blocking sliding member is attached to and embedded in the sliding groove, an inner wall of the blocking sliding member is flush with an inner wall of the sliding groove, an interior of the blocking sliding member is provided with a paste outlet at a position opposite to the paste extruding cavity, and the paste outlet is configured to discharge the lead paste to the filling cavity.

6. The paste extruding device for the tubular positive plate according to claim 5, wherein a thermal insulation partition plate is vertically provided on an inner wall of a top end of the blocking sliding member, and the thermal insulation partition plate has a ring structure; the thermal insulation partition plate is slidably attached to an inner wall of the filling cavity, and the thermal insulation partition plate is configured to block the lead paste from above.

7. A paste extruding method for a tubular positive plate, applied to the paste extruding device for the tubular positive plate according to claim 6, wherein the paste extruding method comprises the following steps:
   S1: inserting each rib of the plate main body into the corresponding processing tube, wherein the bottom end of the rib is inserted into a fixing base at the inner bottom of the processing tube;
   S2: connecting the paste extruder in parallel to each paste extruding cavity by a conduit, and connecting the cooling water tank in parallel to each cooling cavity and the paste extruder by a conduit;
   S3: performing primary paste extrusion processing:
   driving, by the lifting component, the processing tube to move to an uppermost position, wherein an area of the filling cavity opposite to the paste extruding cavity is a first filling area, the blocking sliding member is located at a bottom of the sliding groove, the thermal insulation partition plate blocks at a top surface of the first filling area, and the fixing base is located at a bottom of the first filling area; and
   extruding the lead paste by the paste extruder, such that the first filling area is gradually filled with the lead paste, the thermal insulation partition plate blocks the lead paste from the top, the blocking sliding member blocks the lead paste from a side portion, and the fixing base blocks the lead paste from the bottom until the first filling area is fully filled with the lead paste;

S4: performing secondary paste extrusion processing:
   driving, by the lifting component, the processing tube to move downwards, such that the first filling area is arranged opposite to the cooling cavity, and an area of the filling cavity opposite to the paste extruding cavity is a second filling area; during an upward movement, the lead paste in the first filling area is rapidly solidified by the cooling cavity to form a solid first lead paste coating; and
   extruding the lead paste by the paste extruder, such that the second filling area is gradually filled with the lead paste, the thermal insulation partition plate blocks the lead paste from a top, the blocking sliding member blocks the lead paste from a side portion, and the solid first lead paste coating blocks the lead paste from a bottom until the second filling area is fully filled with the lead paste;
   S5: performing tertiary paste extrusion processing:
   driving, by the lifting component, the processing tube to move downwards, such that the second filling area is arranged opposite to the cooling cavity, and an area of the filling cavity opposite to the paste extruding cavity is a third filling area; during the upward movement, the lead paste in the second filling area is rapidly solidified by the cooling cavity to form a solid second lead paste coating; and
   extruding the lead paste by the paste extruder, such that the third filling area is gradually filled with the lead paste, the thermal insulation partition plate blocks the lead paste from a top, the blocking sliding member blocks the lead paste from a side portion, the solid second lead paste coating blocks the lead paste from a bottom until the third filling area is fully filled with the lead paste, and the entire filling cavity is also completely filled;
   S6: performing quaternary paste extrusion processing:
   driving, by the lifting component, the processing tube to move downwards, such that the third filling area is arranged opposite to the cooling cavity, and the paste extruding cavity no longer corresponds to the filling cavity; during the upward movement, the lead paste in the third filling area is rapidly solidified by the cooling cavity to form a solid third lead paste coating; and
   S7: demolding and taking out the positive plate.

8. The paste extruding method for the tubular positive plate according to claim 7, wherein the step of demolding and taking out the positive plate comprises: driving, by the lifting component, the processing tube to move downwards, such that the processing tube is separated from the processing sliding base, and removing a half of a shell of the processing tube, such that the positive plate is pulled out upwards, and the rib and a lead paste coating on an outer wall of the rib are separated from the corresponding processing tube.

9. The paste extruding device for the tubular positive plate according to claim 2, wherein a length of the rib is identical to a length of the filling cavity, and a distribution length of the paste extruding cavity is one third of the length of the filling cavity; and the distribution length of the paste extruding cavity is identical to a distribution length of the cooling cavity.

* * * * *